United States Patent [19]

Deering

[11] Patent Number: 5,183,488

[45] Date of Patent: Feb. 2, 1993

[54] MULTI-STAGE FILTER FRAME ASSEMBLY

[75] Inventor: Richard A. Deering, Madison, Wis.

[73] Assignee: Research Products Corporation, Madison, Wis.

[21] Appl. No.: 876,177

[22] Filed: Apr. 30, 1992

[51] Int. Cl.⁵ .............................................. B01D 46/02
[52] U.S. Cl. ........................................ 55/320; 55/483;
   55/486; 55/493; 55/513; 55/DIG. 31
[58] Field of Search ................. 55/315, 320, 483, 486,
   55/493, 507, 513, 501, DIG. 31

[56] References Cited

U.S. PATENT DOCUMENTS

| | | | |
|---|---|---|---|
| 3,243,943 | 4/1966 | Geyzin | 55/501 X |
| 3,774,377 | 11/1973 | Bishop | 55/493 |
| 4,762,053 | 8/1988 | Wolfert | 55/493 X |

*Primary Examiner*—Charles Hart
*Attorney, Agent, or Firm*—Andrus, Sceales, Starke & Sawall

[57] ABSTRACT

A multi-stage filter assembly having a number of filter media layers, at least one of which is removably mounted to a filter frame, utilizes a retaining clip to hold the filter media in place. The retaining clip is in the form of an elongated strip that extends across the filter media and has its ends disposed within channels formed in the frame. The elongated strip is provided with a centrally located bend that causes the ends of the clip to be urged upwardly into engagement with the framework and causes a portion of the clip to be urged downwardly into engagement with the filter media.

7 Claims, 4 Drawing Sheets

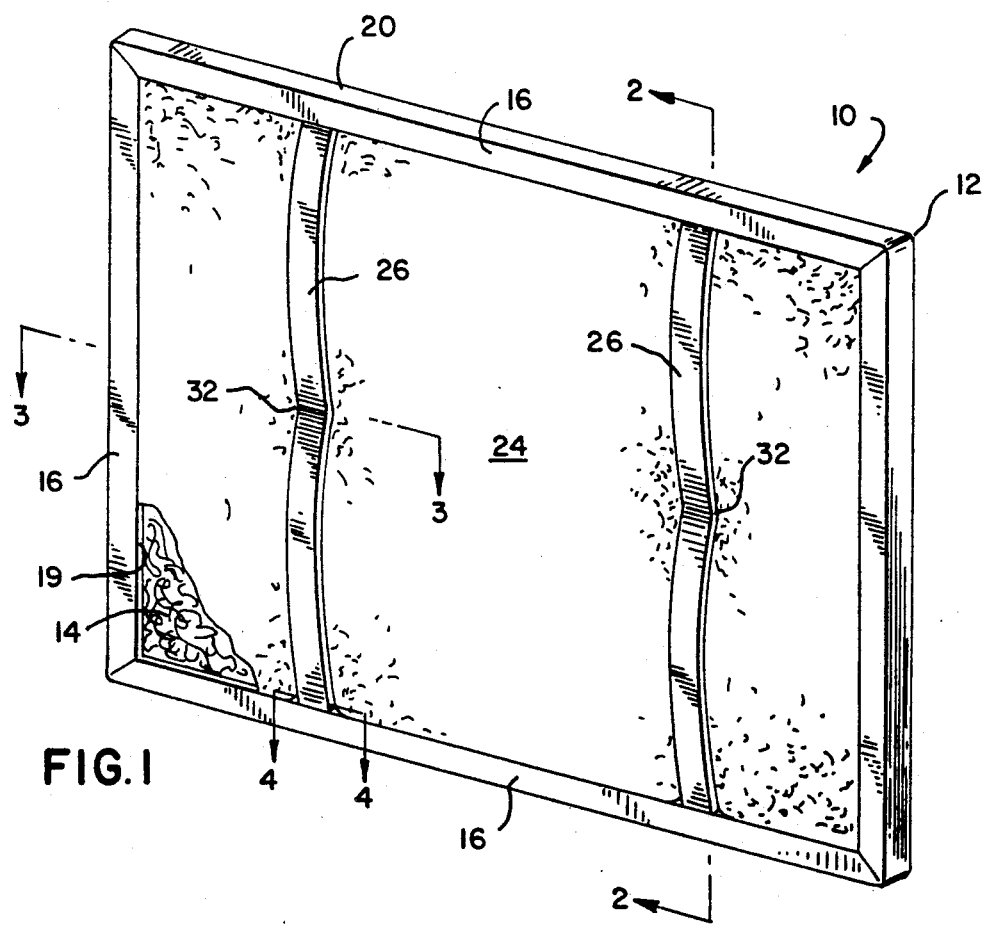
FIG. 1
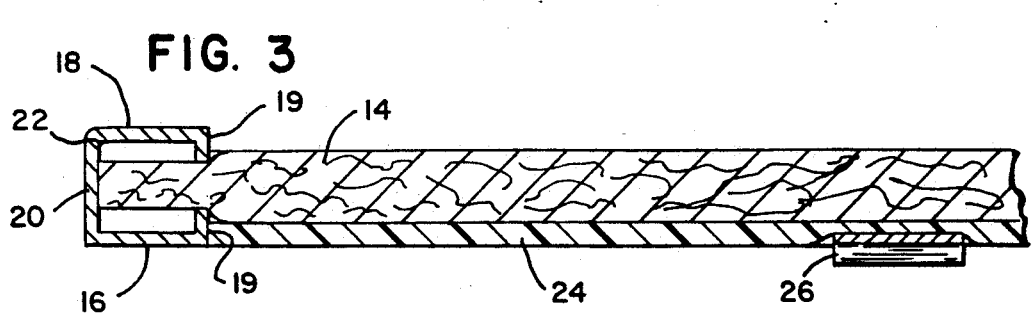
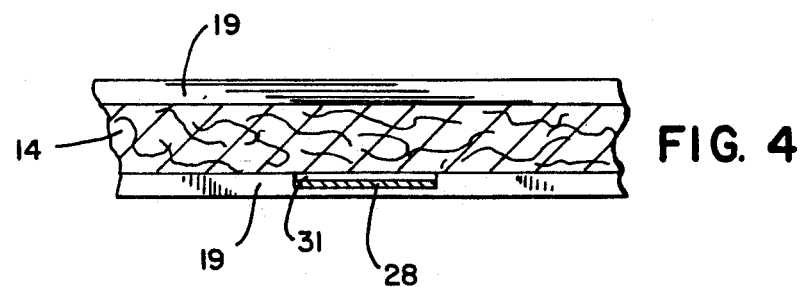

MULTI-STAGE FILTER FRAME ASSEMBLY

BACKGROUND OF THE INVENTION

Non-removably mounted particulate and gaseous filter media have been housed in more or less conventional permanent frame constructions for many, many years. Such frames generally consist of metal channel members forming the four sides of a rectangular configuration with the edges of the filter media being disposed within the channels. Typically the side walls of the channel members are bent inwardly to firmly engage and fix the outer edges of a layer of filter media in position within the frame.

While this is generally a satisfactory construction for particulate filter media of relatively long life or which can be cleaned and re-used, it represents a considerable expense in those applications wherein the filter media is relatively short-lived. In such situations, a disposable and replaceable media is desirable.

In applications wherein a combination of particulate and gaseous filter media are required, it is not unusual for one or more types of such media to be relatively shortlived. In this situation, a less expensive disposable filter media held by an inexpensive throwaway frame construction is desirable.

However, most prior frame constructions of the stronger permanent type do not readily permit removal and replacement of layers of filter media held therein and the less expensive disposable frame constructions are less sturdy, weak and otherwise not satisfactory for certain applications. This type of prior art incorporated all filter media within a singular frame which must be thrown away when one or more of the filter media has served its useful life or to employ a separate filter frame for each type of media used.

Other prior art filter assemblies such as that in U.S. Pat. No. 4,737,147 utilized a plurality of clips to removably retain layers of filter media, but the clips had an awkward shape that was complex to manufacture and whose installation was less than simple. The clips also could not readily accept and accommodate multiple layers of removable filter media.

It is an object of the present invention to provide a filter assembly having one or more disposable layers of filter media removably retained within a filter frame by a plurality of elongated clips that are easily manufactured and installed.

SUMMARY OF THE INVENTION

A multi-stage filter assembly includes a first filter layer having its outer edges disposed within a channel defined by the top, bottom and side walls of a metal frame.

In accordance with one aspect of the invention, at least one additional filter layer is disposed in a freely overlying relationship to the first filter layer.

In accordance with another aspect of the invention, a plurality of elongated retaining clips extend across the overlying filter layer and have a first end removably disposed within a channel in the frame and a second end removably disposed within an opposite channel in the frame.

In accordance with still another aspect of the invention, the top and/or bottom walls of the metal frame is/are provided with a lip that is integral with the wall and extends from the inner edge of the wall into engagement with the first filter layer.

In accordance with another aspect of the invention, the lip is provided with notches that help locate and position the retaining clips in the channels.

In accordance with yet another aspect of the invention, the retaining clip has a centrally located bend disposed along its length so that the ends of the clip are urged upwardly into engagement with a frame wall while a portion of the retaining clip is urged into contact with the second filter layer. The centrally disposed bend causes the retaining clip to assume a flattened V shape when the clip is not disposed within the frame.

The present invention thus provides a filter assembly in which at least one of the layers of filter media is removable and disposable and is retained within the filter frame by a plurality of retaining clips that are easily manufactured and installed.

BRIEF DESCRIPTION OF THE DRAWINGS

The drawings illustrate the best embodiment presently contemplated of carrying out the invention.

In the drawings:

FIG. 1 is a perspective view with parts broken away of a filter assembly constructed according to the present invention;

FIG. 3 is a sectional view along the line 3—3 of FIG. 1;

FIG. 4 is a sectional view along the line 4—4 of FIG. 1;

DETAILED DESCRIPTION OF THE INVENTION

Figure 2:
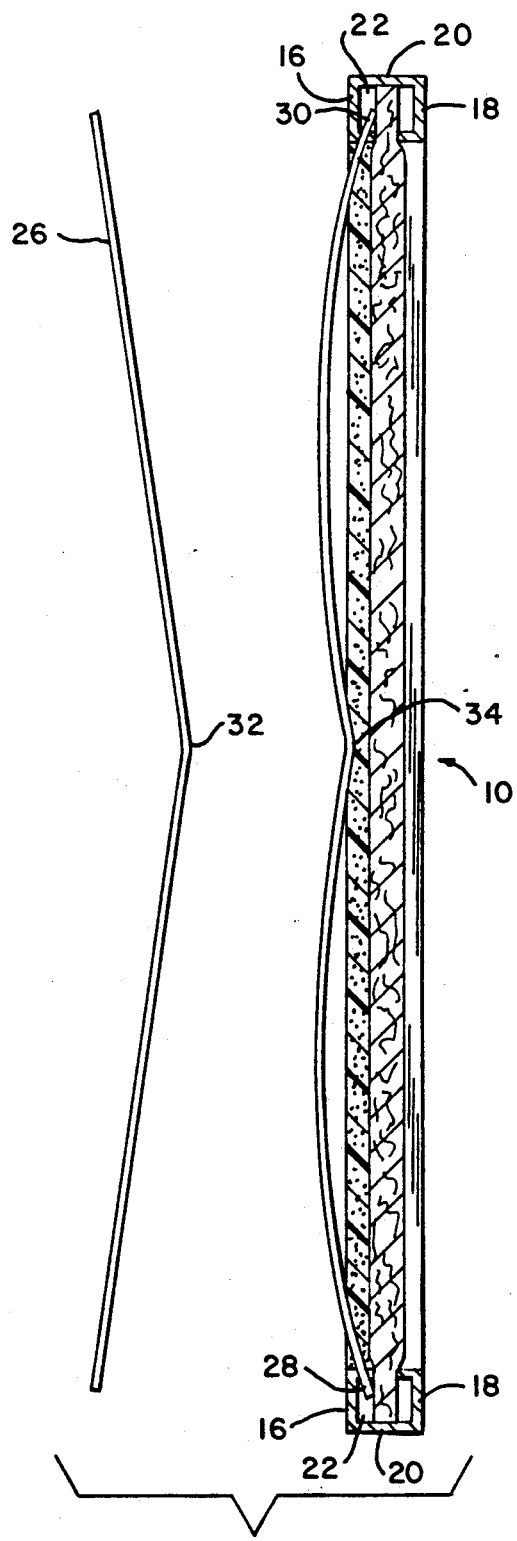
FIG. 2 is a sectional view along the line 2—2 of FIG. 1 and a side view of the retaining clip as it appears when removed from the filter frame.

As shown in FIG. 1, a multi-layered filter assembly 10 includes a generally rectangular metal frame 12 in which one or more layers of filter media 14 are permanently disposed.

The metal frame 12 includes a top wall 16 and a bottom wall 18 which are connected by a side wall 20. Walls 16, 18 and 20 define a channel 22 in which the edges of filter media 14 are disposed. Walls 16 and 18 are provided with an integral lip 19 that extends from the inner edge of walls 16 and 18 and into engagement with filter media 14.

At least one removable and replaceable filter media layer 24 is disposed in a freely overlying relationship with filter media layer 14.

Removable filter media layer 24 is held in place against filter media layer 14 by a plurality of retaining clips 26.

Retaining clips 26 are in the form of elongated strips which could be made from a number of different materials, but the applicant has found that thin metal strips are well suited for this purpose. Elongated clips 26 have a first end 28 disposed within channel 22 of frame 12 and a second end 30 disposed within a channel 22 on the opposite side of frame 12. To facilitate the locating and positioning of clips 26, lips 19 are provided with notches 31 through which clip ends 28 and 30 extend into channel 22. Each of retaining clips 26 is provided with a centrally located bend 32 which causes clip ends 28 and 30 to be urged upwardly into contact with top walls 16 of frame 12 and which causes the central portion 34 of the retaining clip to be urged downwardly into contact with removable filter layer 24.

As seen in FIG. 2, the centrally located bend 32 causes retaining clip 26 to assume the shape of a flattened V when retaining clip 26 is removed from frame 12.

Figure 5:
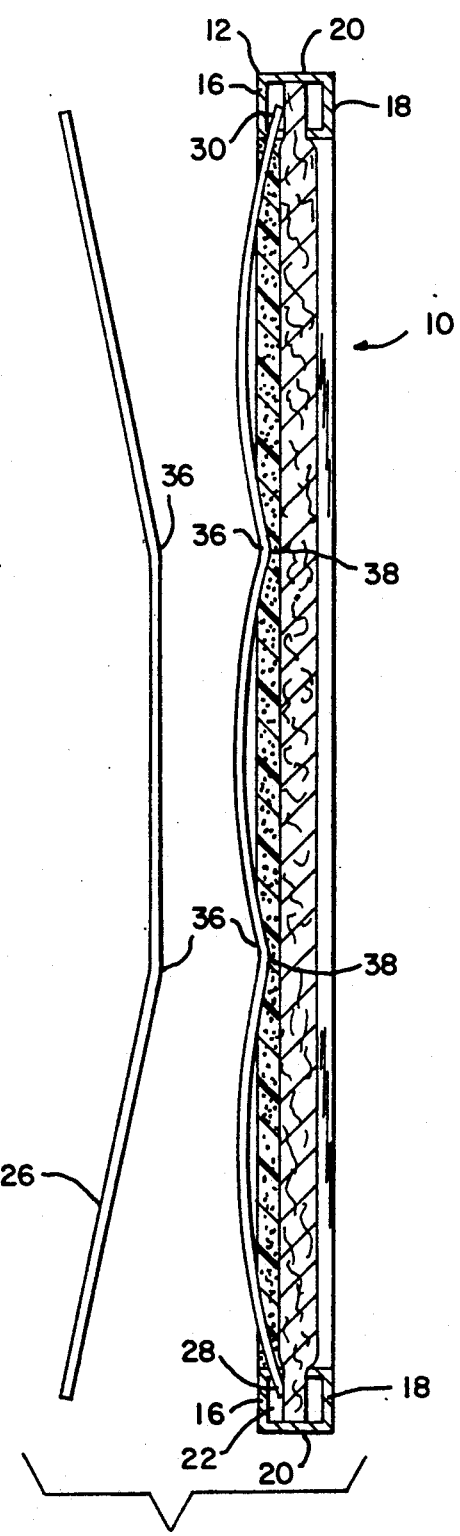
FIG. 5 is a cross-sectional view of an alternate embodiment for the filter assembly and a side view of the alternate embodiment of the retaining clip as it appears when removed from the filter frame.
Figure 7:
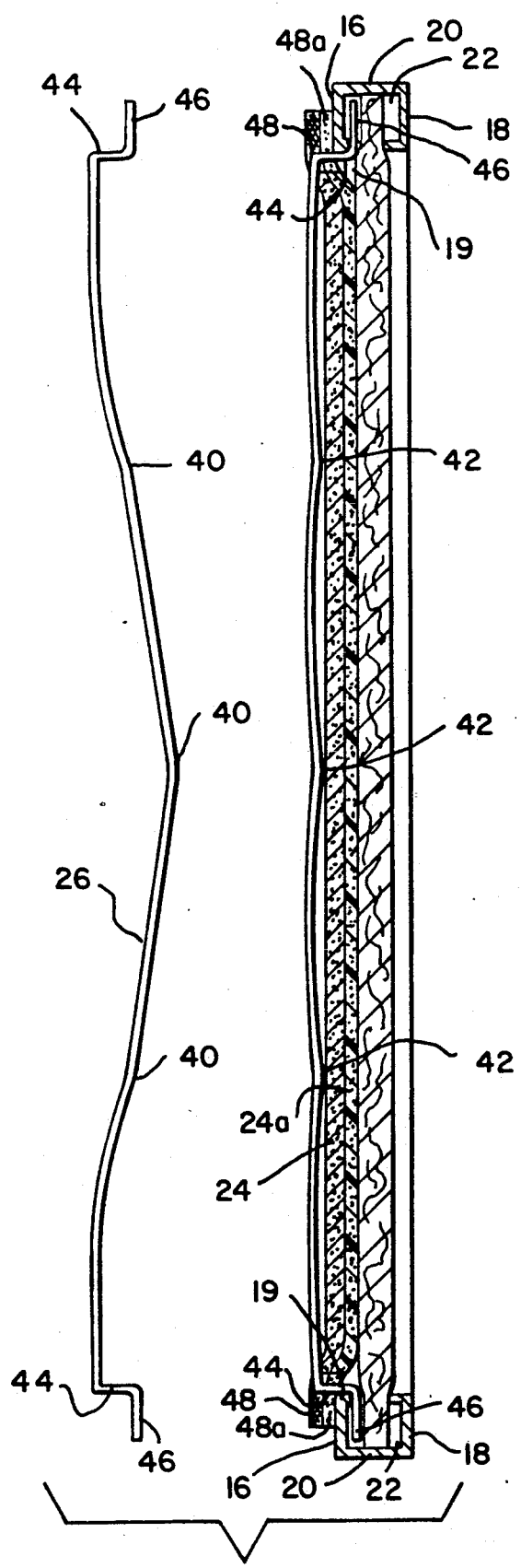
FIG. 7 is a sectional view along the line 7—7 of FIG. 6 and a side view of the alternate embodiment of the retaining clip as it appears when removed from the filter frame.
Figure 6:
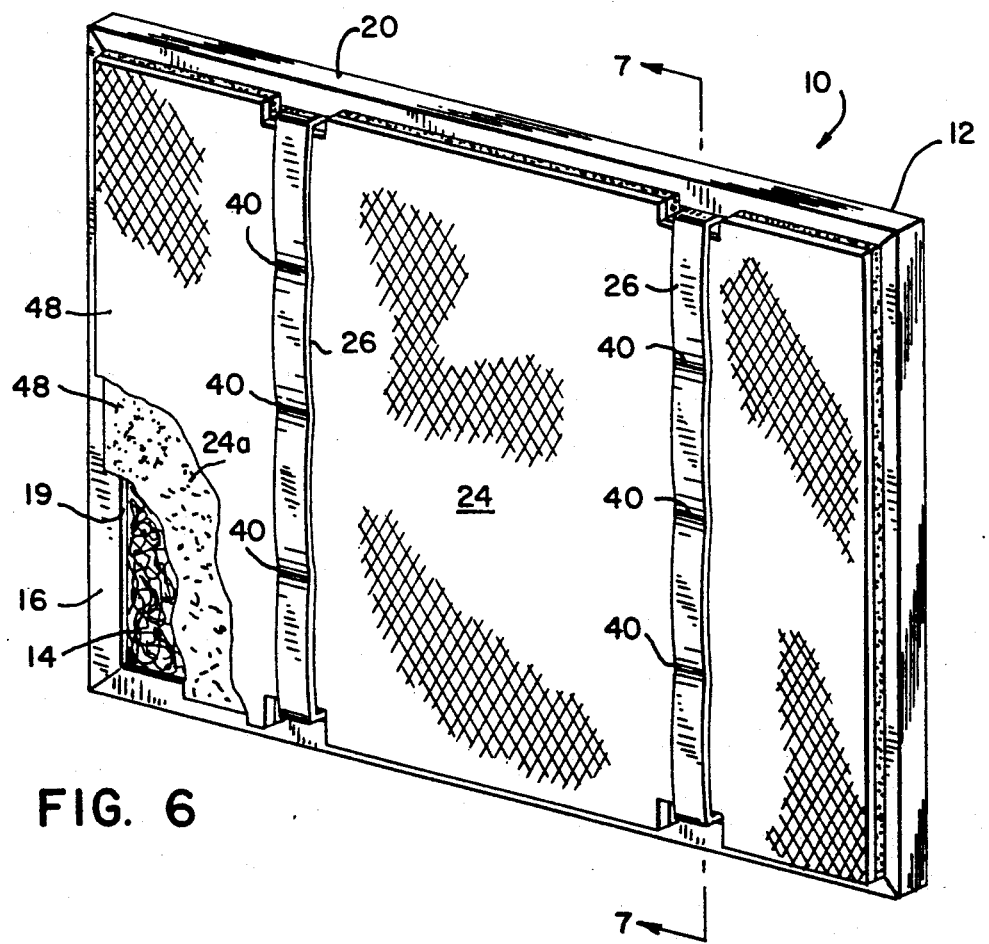
FIG. 6 is a perspective view with parts broken away of a second alternate embodiment for the filter assembly.
Figure 8:
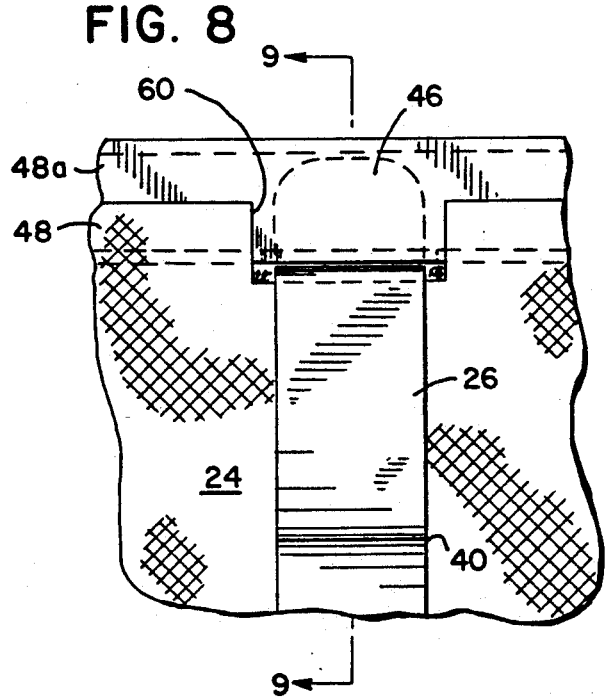
FIG. 8 is an enlarged plan view of the second alternate embodiment with the retaining clip in place.
Figure 9:
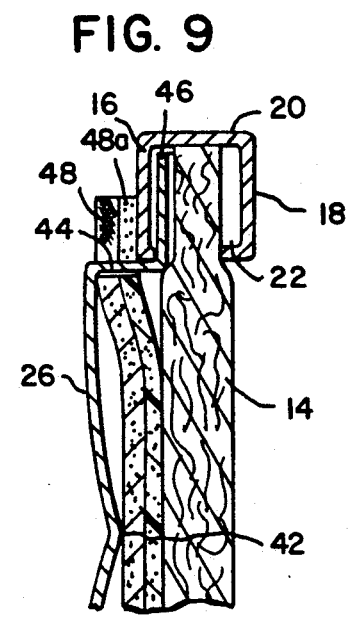
FIG. 9 is a sectional view along the line 9—9 of FIG. 8.

FIG. 5 illustrates an alternate embodiment for retaining clip 26. In this embodiment, elongated clip 26 is provided with a pair of bends 36 which urge the ends of clip 26 upwardly into contact with top wall 16 of frame 12 and cause a pair of pressure points 38 to come into contact with removable filter layer 24.

As seen in FIG. 5, bends 36 cause retaining clip 26 to assume the shape of a flattened U when retaining clip 26 is removed from frame 12.

In larger filter assemblies it is also possible to use clips having three or more bends.

FIGS. 6-9 illustrate yet another embodiment for retaining clip 26. In this embodiment, elongated clip 26 is provided with multiple bends 40 which result in multiple pressure points 42 in contact with removable filter layer 24.

In this embodiment, each of the ends of clip 26 is provided with a downwardly extending flange 44 that is substantially parallel to side wall 20 and engageable with lip 19. A leg 46 is integral with and extends outwardly from flange 44 substantially parallel to top wall 16. When clip 26 is positioned in frame 12, leg 46 will be disposed in channel 22.

Removable filter layers 24 and 24a are dimensioned so that filter layer edges 48 and 48a extend beyond and/or overlap metal frame 12. In this regard, filter layers 24 and 24a are provided with a notch 50 that accommodates clip flange 44 and leg 46. The length of flange 44 can be varied to accommodate various numbers of removable filter layers.

The present invention thus provides a filter assembly having a removable and disposable filter layer that is retained in the filter frame by retaining clips that are easily manufactured and installed.

Various modes of carrying out the invention are contemplated as being within the scope of the following claims particularly pointing out and distinctly claiming the subject matter regarded as the invention.

I claim:

1. A multi-stage air filter assembly comprising:
   a first filter layer having its outer edges disposed within a channel defined by the top, bottom and side walls of a metal frame,
   at least one additional filter layer disposed in a freely overlying relationship to said first filter layer, and
   a plurality of elongated retaining means extending across said additional filter layer and having a first end removably disposed within a first frame channel and a second end removably disposed within a second channel opposite said first channel, said retaining means having at least one bend disposed along its length whereby said first and second ends are urged upwardly away from said additional filter layer and into engagement with a frame wall and a portion of said retaining means is urged into contact with said additional filter layer.

2. The air filter assembly defined in claim 1 wherein at least one of said top and bottom walls has a lip integral with and extending from the inner edge of said wall and into engagement with said first filter layer and
   said first end of said retaining means extends through a notch in said lip and into said first frame channel and said second end of said retaining means extends through a notch in said lip and into said second frame channel opposite said first channel.

3. The air filter assembly defined in claim 1 wherein said bend in said retaining means is centrally located so that said retaining means assumes a flattened V-shape when not disposed within said frame.

4. The air filter assembly defined in claim 1 wherein said retaining means is provided with a pair of bends disposed equally along its length so that said retaining means assumes a flattened U-shape when not disposed within said frame.

5. The air filter assembly defined in claim 1 wherein each end of said elongated retaining means is provided with a downwardly extending flange portion disposed substantially parallel to said frame side wall and a leg portion connected to and extending outwardly toward said frame side wall substantially parallel to said frame top wall.

6. The air filter assembly defined in claim 1 wherein said removable filter layer is dimensioned so as to overlap said metal frame and said removable filter layer is provided with a plurality of notches through which the ends of said retaining clips pass in order to be received in said first and second channels.

7. A multi-stage air filter assembly comprising:
   a first filter layer having its outer edges disposed within a channel defined by the top, bottom and side walls of a metal frame, with at least one of said top and bottom walls having a lip integral with and extending from the inner edge of said wall and into engagement with said first filter layer,
   at least one additional filter layer disposed in a freely overlying relationship to said first filter layer, and
   a plurality of elongated retaining means extending across said additional filter layer and having a first end extending through a notch in said lip so that said first end is removably disposed within a first frame channel and said retaining means having a second end extending through a notch in said lip so that second end is removably disposed within a second channel opposite said first channel,
   said retaining means having at least one bend disposed along its length whereby said first and second ends are urged upwardly away from said additional filter layer and into engagement with a frame wall and a portion of said retaining means is urged into contact with said additional filter layer.

* * * * *